IRA W. SHERWOOD.
Improvement in Animal-Pokes.
No. 127,107. Patented May 21, 1872.
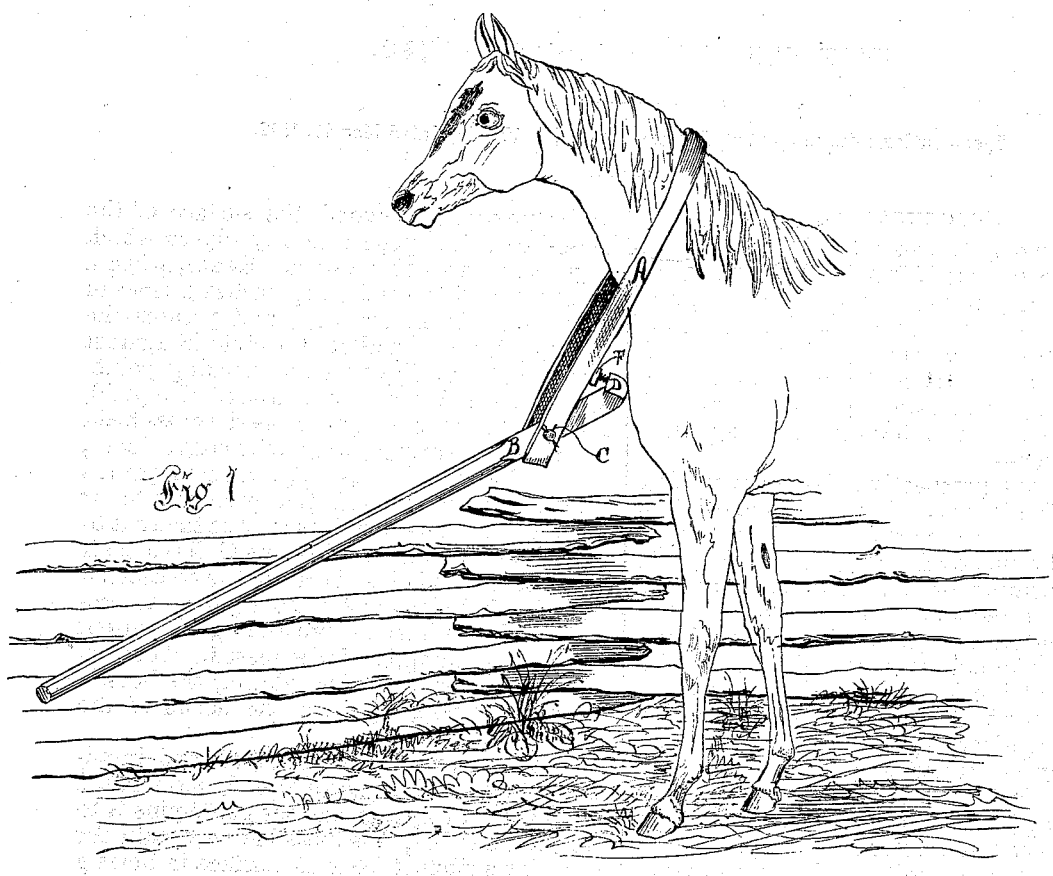
Fig. 1
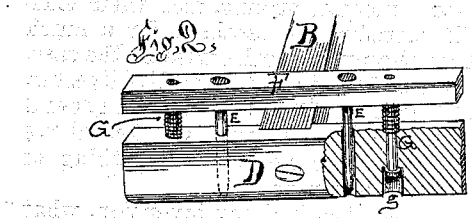
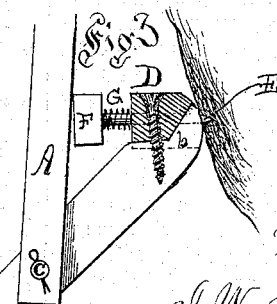
Witnesses
E. R. McKean
S. W. Wood
Inventor
I. W. Sherwood
By his atty
R. L. Smith 127,107

UNITED STATES PATENT OFFICE.

IRA W. SHERWOOD, OF MOUNT MORRIS, NEW YORK.

IMPROVEMENT IN ANIMAL-POKES.

Specification forming part of Letters Patent No. 127,107, dated May 21, 1872.

SPECIFICATION.

*To all whom may it concern:*

Be it known that I, IRA W. SHERWOOD, of Mount Morris, in the county of Livingston and State of New York, have invented a new and useful Improvement in Animal-Pokes; and I do hereby declare the following to be a full, clear, and exact description of the same, reference being had to the accompanying drawing, in which—

Figure 1 is a perspective view representing my invention in use. Fig. 2 is a perspective sectional view of a portion of my invention, showing the mode of construction. Fig. 3 is a side elevation of the same, showing the cross-head in section.

My invention relates to that class of animal-pokes wherein the stale is jointed to the neck-bow, and pricking points are employed in such a way that when the animal presses said stale against any object said points will be thereby protruded and prick his breast; and the object of my invention is to attach the pricking points to a yielding head or bar, which is arranged to move on guide-pins whose heads are seated in holes in the cross-head so as not to be protruded. Heretofore the heads of said guide-pins have protruded at each movement of the yielding bar, and the hairs of the horse's mane were liable to catch thereon and be pulled out.

That others may more fully understand my invention, I will more particularly describe it.

A is the bow which passes around the animal's neck, and attaches the stale or poke B, which is pivoted to the lower ends of said yoke by the cross-pin C. Said cross-pin C passes through the stale B at a point a little distance from the upper end of the same, as shown in Figs. 1 and 2. Across the upper end of the stale B, and rigidly secured thereto, is the cross-head D, which, when in position, rests against the breast of the horse, as shown in Fig. 1. The prick-points E are rigidly set in a yielding bar, F, which is interposed between the cross-head D and the yoke A, and any movement of the stale B upon the pivot C, which would tend to bring said cross-head and yoke nearer together, will cause the said points to be protruded beyond the surface of the cross-head and penetrate any object which may be in contact therewith. Hence, when a horse wearing this poke approaches a fence or other obstacle in his way, and presses the lower or forward end of the stale B against said object, he will cause the pricking points to protrude and warn him to desist. The yielding bar F is kept separate from the cross-head by means of springs, which, for convenience, I make of wire wound spirally, and said springs may be placed around the prick-points or around the guide-pins G, as may be thought to be advisable. The guide-pins G have their heads seated in holes *g* bored in the cross-head D, and said holes are sufficiently deep to prevent said heads from protruding therefrom when the yielding bar is depressed. There is, therefore, no liability of mutilating the horse's mane by entangling with the heads of the guide-pins.

By the means above described, and in addition to the advantages already set forth, I will state that by securing the guide-pins G to the yielding bar, it is possible to obtain for said pins sufficient bearing surface in holes *g* to cause the yielding bar to move without material departure from its parallelism with the head D, and thereby the spiral springs, which are preferably made of brass wire, are preserved from unequal strains, and their elasticity will therefore be retained for a much longer time than would otherwise be the case.

I am aware of the invention of N. Silvester, patented December 10, 1867, which in general arrangement resembles my invention above described, and I do not claim anything of which he is the inventor.

Having now described my invention, what I claim as new is—

In an animal-poke the guide-pins G, with heads seated in holes *g*, as set forth, combined with the cross-head D, yielding bar F, and prick-points E, as described.

I. W. SHERWOOD.

Witnesses:
R. D. SMITH,
E. M. GALLAHER.